Patented Oct. 2, 1934

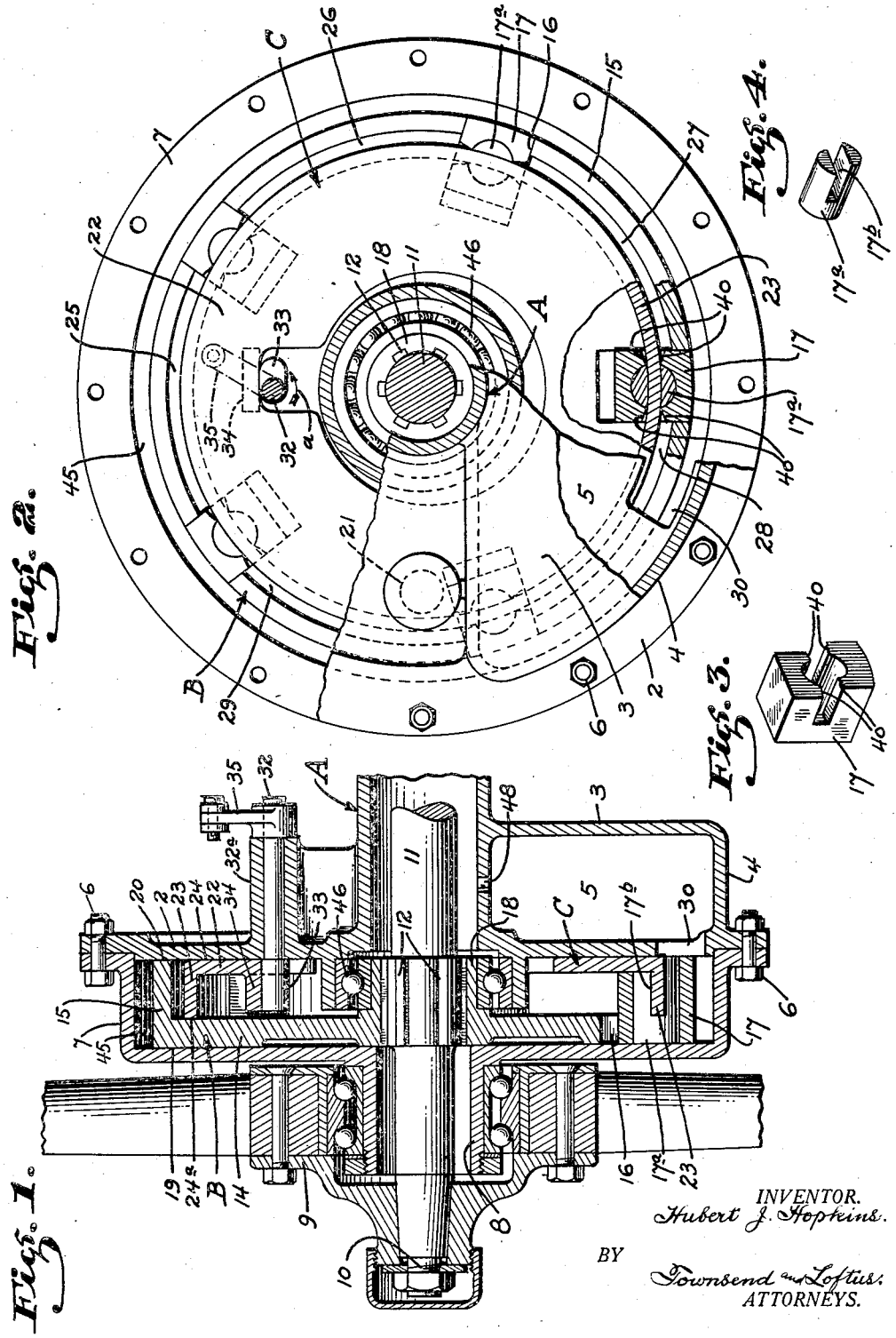

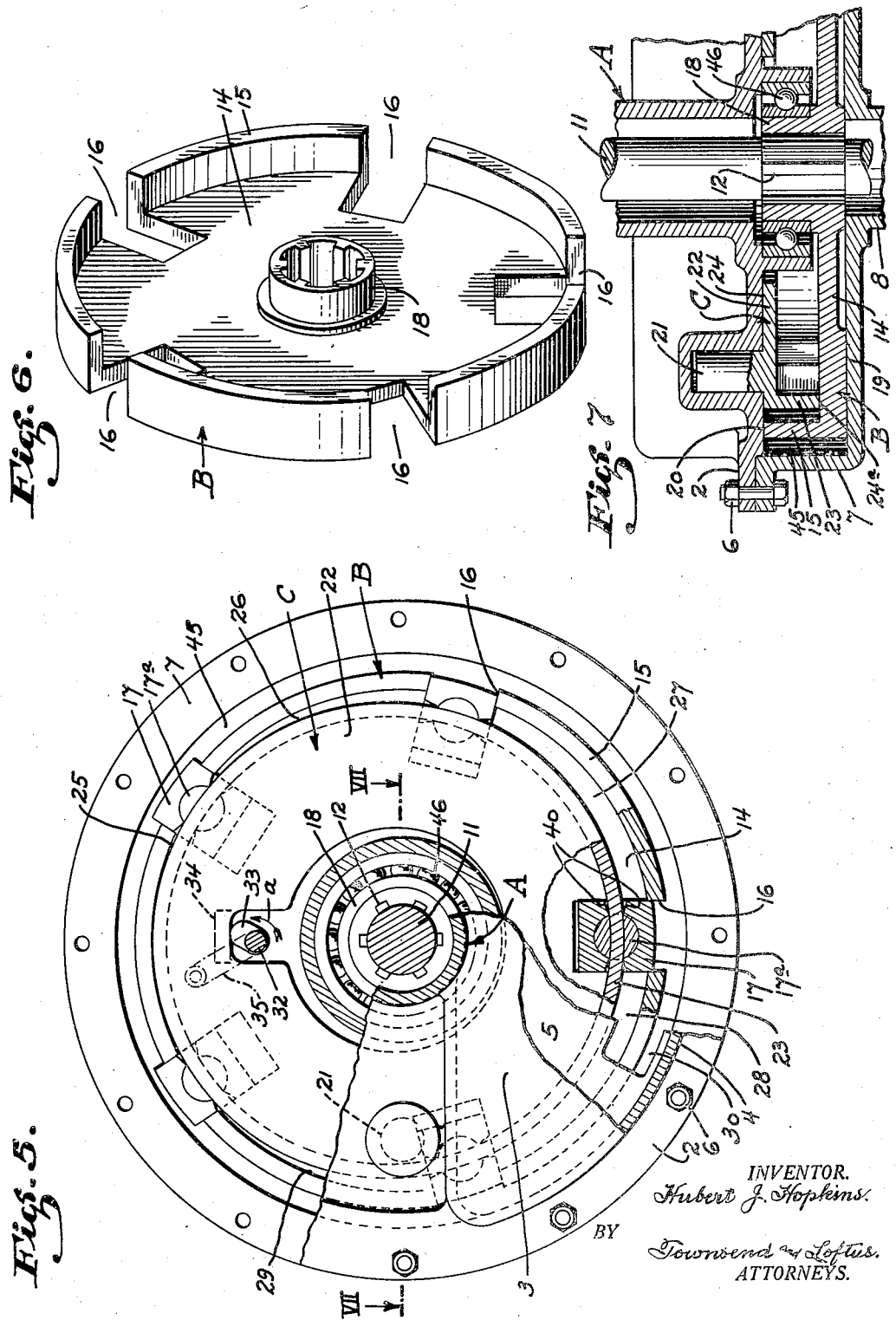

1,975,362

UNITED STATES PATENT OFFICE 1,975,362

HYDRAULIC BRAKE

Hubert J. Hopkins, Hayward, Calif.

Application November 27, 1933, Serial No. 699,865

6 Claims. (Cl. 188—90)

This invention relates to brakes and especially to hydraulic brakes intended for use on motor vehicles, and the like.

The object of the present invention is to generally improve and simplify the construction and operation of hydraulic brakes; to provide a brake which is smooth and silent in operation; to provide a brake in which adjustments and take-ups to compensate for wear may be eliminated; to provide a brake which is dust and waterproof and in which a braking medium, such as oil, is employed, said medium also functioning as a lubricant to the moving parts of the brake; and further, to provide a brake which is compact in construction, positive in action, and which can be easily and quickly operated.

The brake is shown by way of illustration in the accompanying drawings, in which—

Fig. 1 is a central, vertical, cross section of the brake showing it connected with one of the rear driving wheels of a motor vehicle.

Fig. 2 is a side elevation showing a portion of the axle housing flange removed, parts of said view being in section.

Fig. 3 is a perspective view of one of the vanes.

Fig. 4 is a perspective view of one of the pins connecting the vanes to the guide member.

Fig. 5 is a side elevation similar to Fig. 2, but showing the guide member in eccentric position.

Fig. 6 is a perspective view of the rotor.

Fig. 7 is a cross section taken on line VII—VII of Fig. 5, said view showing the pivotal support of the guide member.

Referring to the drawings in detail, and particularly Figs. 1 and 2, A indicates the rear axle housing of a motor vehicle, or the like. Formed integral with said housing is an annular flange 2 and also formed integral with the housing and with the flange are walls 3 and 4, interior of which is formed an oil well generally indicated at 5. Secured to the annular flange 2 by means of bolts 6, or the like, is a housing 7 and formed integral with the housing is a hub member 8 on which is journaled the hub 9 of one of the rear driving wheels of the motor vehicle.

Extending through the axle housing A and the hub 8 and secured to the hub 9 of the wheel, as at 10, is a driving axle 11. Mounted within the housing 7 is a rotor generally indicated at B. This rotor is splined to the axle 11, as indicated at 12, and rotates in unison therewith. The rotor B is best shown in Figs. 1 and 6. It consists of a disc 14 on the peripheral edge of which is formed an annular flange 15. This flange, and a portion of the disc 14, is provided with a plurality of radially disposed slots 16 and these function as guides for a plurality of vanes generally indicated at 17, see Figs. 1, 2 and 3. The disc portion of the rotor is provided with a hub 18 and the interior thereof is provided with longitudinally extending keys to engage the splined portion 12 of the axle 11.

The outer face 19 of the rotor, see Fig. 1, is maintained in running contact with the inner face of the housing 7, and the outer face of the annular flange 15 makes running contact with the inner face of the axle housing flange 2, as indicated at 20. The contacts maintained at the points 19 and 20 are sufficient to prevent excessive leakage as will hereinafter be described.

Pivotally supported, as at 21, in the axle housing flange 2 is a guide member generally indicated at C. This guide consists of a disc 22 on the peripheral edge of which is formed an annular flange 23. The outer face of the disc makes contact with the inner face of the axle housing flange 2, as indicated at 24, and the face of the flange 23 makes contact with the inner face of the rotor B, as indicated at 24a, the contacts maintained at the points 24 and 24a being sufficient to prevent excess leakage. The guide member C, composed of the disc 22 and the annular flange 23, is of smaller diameter than the interior diameter of the rotor B and an annular chamber is thus formed between the rotor and the guide member which is divided into a plurality of chambers by the vanes 17. Oil, and a certain amount of air, is admitted to these chambers, which are indicated at 25, 26, 27, 28, 29, through a port 30 which communicates with the bottom of the oil well 5. The disc C supported on the pivot 21 is normally maintained in a concentric position with relation to the rotor B when the brake is inoperative but means are provided for moving the disc about the pivot 21 to assume an eccentric position, as shown in Fig. 5, when a braking action is desired. When eccentric movement is imparted to the guide member C the cubic capacity of the chambers formed between the vanes will vary, the capacity of said chambers being the largest when they communicate with the port 30 and decreasing in cubic capacity as they approach the position opposite to the port 30, or that indicated by the chamber 25. If oil and air have been admitted into the chambers or spaces between the vanes, such oil and air will be compressed and such compression resists rotation of the rotor and thereby produces a braking action. Oil alone is, for all practical purposes, incompressible and if each chamber was completely filled with oil it would be difficult to move the guide member C from a concentric to an eccentric position. In operation it is, however, found that the chambers do not completely fill with oil and it is thus possible to obtain the eccentric movement desired. Furthermore, there will be a slight leakage of oil between the contacting parts, indicated at 24 and 24a, and there will also be a slight leakage around the sides of the vanes through the slotted pins supporting the vanes, as will hereinafter be described. Such leakage will permit escape of a certain amount of oil when the cubic capacity of the chambers varies but such escape is resisted by the fairly close contacts provided and braking action is not impaired.

In order that eccentric movement may be imparted to the guide member C a shaft 32, see Fig. 1, is provided. This shaft is journaled in a hub 32a formed on the inner face of the axle housing flange 2. On the inner end of the shaft 32 is mounted a cam 33 and this engages the shoulder 34 formed on the inner face of the disc portion of the guide member. The outer end of the shaft is provided with a crank arm 35 and this is connected with a foot brake pedal through a link member not shown. When the foot pedal is depressed movement is imparted to the cam 33. The cam will swing in the direction of arrow a, see Fig. 5, and will thus engage shoulder 34 and thereby swing the guide member about the pivot so that it will assume the eccentric position shown in Fig. 5, and when the foot pedal is released the disc will return to normal or concentric position such as shown in Fig. 2, first by gravity action, and secondly by the unbalanced pressure in the several chambers formed between the vanes. When concentric position is assumed movement in the opposite direction is prevented by engagement of the shoulder 34 with the side of the cam or the shaft 32.

During eccentric movement of the guide member, lateral movement will be imparted to the vanes. This is accomplished as follows: It has previously been stated that the vanes, indicated at 17, are mounted in the radial slots 16 of the rotor. They would be drawn outwardly into engagement with the inner face of the housing 17 by centrifugal action unless otherwise prevented. To prevent such movement each vane is cross slotted, as shown in Fig. 3. A pin 17a is also placed on each vane and each pin is slotted, as at 17b, to receive the flange 23 of the guide member, the slots 17b being curved to fit the contour of the flange 23 and to make a substantially leak-proof contact therewith. It may thus be said that the pins are carried by the flange 23 and that the vanes again are carried by the pins, thus if the guide disc assumes a concentric position all of the vanes will assume the same radial position with relation to the center of the rotor 15, but when the guide member is swung to an eccentric position a reciprocal movement will be imparted to the vanes once during each revolution. The cross slot made in the vanes is chamfered at each side as clearly shown at 40, see Figs. 2 and 3, to provide the proper clearance for the eccentric movement.

In actual operation it will be assumed that the well 5 is substantially filled with oil, or a similar fluid medium. If the vehicle is in motion axle 11 will rotate and so will the rotor B and the vanes 17 carried thereby. As each chamber formed between the vanes, the guide member, and the rotor passes the port 30 a certain amount of oil will enter and the space between the vanes which will thus be partially filled with oil and all surfaces will be thoroughly lubricated. The drag or resistance to rotation when the vehicle is running free is thus maintained at a minimum. If it is desired to stop the vehicle, or slow down, it is only necessary to slightly depress the foot pedal. Such motion is transmitted to shaft 32 and cam 33 and the guide member is swung about its pivotal support 21 to assume any desired eccentric position. The moment the guide member swings toward eccentric position the cubic capacity in the chambers 25, 26, 27, 28 and 29 will begin to vary during each revolution, the capacity being the largest when in register with the port 30 thus producing a slight vacuum action to induce the entrance of oil but as the vanes and chambers move from this position to the opposite position, indicated at 25, the capacity reduces and the oil and air compresses and thus imposes a resisting or braking affect. Any leakage of oil which takes place at the contacting point 20 between the rotor and the axle housing flange 2 will enter an exterior annular chamber indicated at 45. This chamber, however, is in direct communication with the port 30 and such leakage oil will thus merely return to the well. Any leakage which takes place around the vanes will similarly enter the chamber 45 and return to the well, while any leakage which takes place between the contacting faces 24 and 24a formed between the axle housing, the guide plate, and the rotor will return through the ball bearings 46 supporting the rotor and will thus enter the axle housing from where it may be returned to the well through a port 48. Leakage around the exterior face 19 of the rotor will hardly be more than is required for lubrication as no pressure is imposed at this point, hence leakage from the well around this face and outwardly into the hub of the wheel will amount to little, if anything, and even though there should be a little leakage it would merely assist in lubricating the anti-friction bearings of the driving wheel.

The hydraulic brake disclosed is exceedingly smooth and silent in action. It is completely enclosed and as such is dust and waterproof. All parts are thoroughly lubricated by the braking medium, to-wit, the oil employed. The brake is operated with a minimum of energy or effort. The braking action is positive and as leakage or loss of oil has been taken care of it will not be necessary to refill the well 5 except at such times as the differential and like portions of the automobile are being taken care of.

While the brake has been described in conjunction with the rear wheels of an automobile, it may obviously be employed wherever a brake is required whether it be on motor vehicles or other types of machines, and while certain features of the present invention are more or less specifically described, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is—

1. A brake of the character described comprising a housing, a shaft extending through the housing, a rotor in the housing secured to the shaft and driven thereby, a non-rotatable guide member within the housing and of smaller diameter than the rotor to form an annular chamber between the guide member and the rotor, a plurality of radially movable vanes carried by the rotor and guided by the guide member, said vanes dividing the annular chamber into a plurality of chambers, means for admitting a fluid medium to said chambers, and means for changing the position of the guide member from a normal concentric position to an eccentric position with relation to the rotor so as to vary the cubic capacity of the chambers formed between the vanes, the rotor and the guide member during rotation of the rotor.

2. A brake of the character described comprising a housing, a shaft extending through the housing, a rotor in the housing secured to the shaft and driven thereby, a plurality of vanes carried by the rotor and driven thereby, said vanes being radially movable, a non-rotatable guide member within the rotor, said guide member being provided with an annular flange, a pin carried by each vane and slotted to straddle the flange on the guide member, said annular flange on the guide member being of smaller diameter than the rotor to form an annular chamber between the rotor and the guide member and said chamber being divided into a plurality of chambers by the vanes, and means for changing the position of the guide member from a normally concentric to an eccentric position with relation to the rotor so as to vary the cubic capacity of the chambers formed between the vanes, the rotor and the guide member during rotation of the rotor.

3. A brake of the character described comprising a housing, a shaft extending through the housing, a rotor in the housing secured to the shaft and driven thereby, a plurality of vanes carried by the rotor and driven thereby, said vanes being radially movable, a non-rotatable guide member within the rotor, said guide member being provided with an annular flange, a pin carried by each vane and slotted to straddle the flange on the guide member, said annular flange on the guide member being of smaller diameter than the rotor to form an annular chamber between the rotor and the guide member and said chamber being divided into a plurality of chambers by the vanes, a pivotal support for the non-rotatable guide member and a rotatable cam engageable with the guide member to swing it about the pivot from a normal concentric position with relation to the rotor to an eccentric position so as to vary the cubic capacity of the chambers formed between the vanes, the rotor and the guide member during rotation of the rotor.

4. A brake of the character described comprising a housing, a shaft extending through the housing, a rotor in the housing secured to the shaft and driven thereby, a plurality of vanes carried by the rotor and driven thereby, said vanes being radially movable, a non-rotatable guide member within the rotor, said guide member being provided with an annular flange, a pin carried by each vane and slotted to straddle the flange on the guide member, said annular flange on the guide member being of smaller diameter than the rotor to form an annular chamber between the rotor and the guide member and said chamber being divided into a plurality of chambers by the vanes, a pivotal support for the non-rotatable guide member, a rotatable cam engageable with the guide member to swing it about the pivot from a normal concentric position with relation to the rotor to an eccentric position so as to vary the cubic capacity of the chambers formed between the vanes, the rotor and the guide member during rotation of the rotor, and means for admitting a fluid medium to said chambers.

5. A brake of the character described comprising a housing, a shaft extending through the housing, a rotor in the housing secured to the shaft and driven thereby, said rotor comprising a disc having running engagement with one interior face of the housing, an annular right angular flange formed on the peripheral edge of the disc and having running engagement with the opposite inner face of the housing, said disc and flange having a plurality of radially disposed slots formed therein, a vane radially movable in each slot, a guide member within the housing and the rotor, said guide member comprising a disc having engagement with the inner face of the housing on the side opposite the rotor, a right angular annular flange formed on the disc and having a running engagement with the inner face of the rotor, said flange on the guide member and the flange on the rotor being spaced apart to form an annular chamber therebetween which is divided into a plurality of chambers by the vanes, a pin in each vane and slotted to straddle the annular flange on the guide member, a pivotal support for the guide member, and a rotatable cam engageable with the guide member at one side of the pivot to swing the guide member about the pivot from a normal concentric position with relation to the rotor to an eccentric position so as to vary the cubic capacity of the chambers formed between the vanes, the rotor and the guide member during rotation of the rotor.

6. A brake of the character described comprising a housing, a shaft extending through the housing, a rotor in the housing secured to the shaft and driven thereby, said rotor comprising a disc having running engagement with one interior face of the housing, an annular right angular flange formed on the peripheral edge of the disc and having running engagement with the opposite inner face of the housing, said disc and flange having a plurality of radially disposed slots formed therein, a vane radially movable in each slot, a guide member within the housing and the rotor, said guide member comprising a disc having engagement with the inner face of the housing on the side opposite the rotor, a right angular annular flange formed on the disc and having a running engagement with the inner face of the rotor, said flange on the guide member and the flange on the rotor being spaced apart to form an annular chamber therebetween which is divided into a plurality of chambers by the vanes, a pin in each vane and slotted to straddle the annular flange on the guide member, a pivotal support for the guide member, a rotatable cam engageable with the guide member at one side of the pivot to swing the guide member about the pivot from a normal concentric position with relation to the rotor to an eccentric position so as to vary the cubic capacity of the chambers formed between the vanes, the rotor and the guide member during rotation of the rotor, a reservoir formed on one side of the housing and filled with oil, and a port in the housing forming communication between said well and the chambers formed between the vanes, the rotor and the guide member.

HUBERT J. HOPKINS.